United States Patent [19]

Pakosh et al.

[11] Patent Number: 5,052,512

[45] Date of Patent: Oct. 1, 1991

[54] REVERSIBLE CONTROL LEVEL LINKAGE

[75] Inventors: Daniel Pakosh; Kevin A. Walker, both of Winnipeg, Canada

[73] Assignee: Ford New Holland, Inc., New Holland, Pa.

[21] Appl. No.: 567,471

[22] Filed: Aug. 14, 1990

[51] Int. Cl.$^5$ .............................................. B60K 26/00
[52] U.S. Cl. .................................. 180/329; 180/334; 180/326
[58] Field of Search ............... 180/315, 316, 317, 318, 180/319, 320, 321–326, 331–336

[56] References Cited

U.S. PATENT DOCUMENTS

| | | | |
|---|---|---|---|
| 3,088,537 | 5/1963 | Tourneau | 180/329 |
| 3,891,003 | 6/1975 | Duttarer et al. | 180/329 |
| 4,372,341 | 2/1983 | Crawley | 137/580 |
| 4,478,308 | 10/1984 | Klaassen | 180/326 |
| 4,730,691 | 3/1988 | Grigg | 180/329 |
| 4,771,855 | 9/1988 | Takashima et al. | 180/326 |
| 4,812,838 | 3/1989 | Tashiro et al. | 180/326 |
| 4,822,962 | 4/1989 | MacCourt | 200/61.88 |

OTHER PUBLICATIONS

Ford New Holland Sales Brochure entitled "100 PTO hp BiDirectional ™ Tractor, 9030 Series".

*Primary Examiner*—Kenneth R. Rice
*Attorney, Agent, or Firm*—Larry W. Miller; Frank A. Seemar; Darrell F. Marquette

[57] ABSTRACT

A reversible actuation linkage associated with a control lever determining the speed and direction of travel of a hydrostatically driven tractor in which the control is mounted with an operator's station pivotally supported to permit orientation of the operator in a selected one of opposing directions is disclosed wherein the linkage includes a cable actuator pivotally connected to a fixed linkage mechanism. The actuator cable includes a clevis mounted for pivotable movement about a vertical pivot axis coinciding with the axis about which the operator's station is rotatably movable. As a result, the actuator cable reversibly effects operation of the hydraulic system to effect movement of the tractor in the direction corresponding to the direction of movement of the control lever irrespective of the rotated position selected for the operator's station.

13 Claims, 5 Drawing Sheets

REVERSIBLE CONTROL LEVEL LINKAGE

BACKGROUND OF THE INVENTION

This invention relates generally to tractors having an operator's station rotatable about an arc of approximately 180° to permit proper orientation of the operator for convenient operation of the tractor in opposing directions and, more particularly, to an actuating linkage operably associated with the control lever for selecting the speed and direction of travel of the hydrostatically driven tractor.

A hydrostatically driven tractor of the type shown in U.S. Pat. Nos. 4,372,341 and in 4,822,962, is operable in opposing directions with equal efficiency. To facilitate the operation of such a tractor, the operator's seat and steering mechanism are formed as a part of a console pivotally supported from the frame of the vehicle to permit rotation of the console about a generally vertical pivot axis to enable a positioning of the operator sitting in the seat cushion to face the direction of travel irrespective of which opposing direction is considered to be forward.

The speed and direction of travel of the hydrostatically driven tractor is controlled from a single control lever connected by a linkage to a hydraulic system to control the flow of hydraulic fluid therethrough for powering movement of the tractor. This control lever is typically stationarily mounted relative to the frame of the tractor within reach of the operator positioned in the operator's seat so that the direction of travel of the vehicle corresponds to the direction the control lever is moved to effect appropriate control of the hydraulic system. However, whenever the operator rotates the operator's station to face in the opposing direction, the control lever becomes positioned on the opposing side of the operator's seat so that the operator must use the opposite hand to manipulate the movement of the control lever.

It would be desirable to mount the control lever for operatively controlling the movement of the tractor with the operator seat in such a manner that the control lever is pivotally moveable with the seat in fixed relation thereto so that the control lever is maintained in a fixed orientation relative to the seat permitting the operator to use the same hand to operate the control lever irrespective of the rotated position of the operator's station. However, it would also be desirable to provide an actuation linkage interconnecting the control lever and the hydraulic system so that the direction of movement of the tractor will correspond to the direction of movement of the control lever irrespective of the rotated position of the operator's station.

SUMMARY OF THE INVENTION

It is an object of this invention to overcome the aforementioned disadvantages of the prior art by providing an actuation linkage permitting reversible control of the hydraulic system by the control lever whenever the operator's station is rotated to an opposing position.

It is another object of this invention to provide a control lever and actuation linkage therefor that is pivotally moveable with an operator's station about an arc of approximately 180° so that the direction of movement of the tractor corresponds to the direction of movement of the control lever irrespective of the rotated position of the operator's station.

It is still another object of this invention to provide an actuation linkage operatively associated with a control lever that is reversible in its actuation of the hydraulic system to which the linkage is connected whenever the control lever is rotatively moved around a pivot axis.

It is a feature of this invention that the actuation linkage for the control lever includes a clevis pivotally connected to a fixed linkage for rotational movement about a vertical pivot axis coinciding with the axis about which the operator's station is rotatable.

It is another feature of this invention that the actuation linkage includes a flexible push/pull cable interconnecting the control lever and the pivotally mounted clevis.

It is an advantage of this invention that the control lever effects a flow of hydraulic fluid through the tractor hydraulic system to cause movement of the tractor in the direction corresponding to the direction in which the control lever is moved.

It is another advantage of this invention that the tractor will move in the direction corresponding to the direction of movement of the control lever irrespective of the rotated position of the operator's station.

It is still another feature of this invention that the fixed linkage is positioned within the pivot mechanism mounting the operator's station for rotatable movement so as not to interfere with the rotational movement of the operator's station structure.

It is still another advantage of this invention that only the flexible push/pull cable rotatably moves with the control lever during movement with the rotatable operator's station.

It is yet another advantage of this invention that the operator will utilize the same hand to operate the control lever irrespective of the rotated position of the operator's station.

It is a further advantage of this invention that the position of the control lever effecting operative control of the direction and speed of movement of the tractor is positioned in a fixed relationship with respect to the operator's seat.

It is yet another object of this invention to provide a reversible control lever actuation linkage for use with a rotatable operator's station to permit operative control of a hydrostatically driven tractor which is durable in construction, inexpensive of manufacture, carefree of maintenance, facile in assemblage, and simple and effective in use.

These and other objects, features and advantages are accomplished according to the instant invention by providing a reversible actuation linkage associated with a control lever determining the speed and direction of travel of a hydrostatically driven tractor in which the control is mounted with an operator's station pivotally supported to permit orientation of the operator in a selected one of opposing directions wherein the linkage includes a cable actuator pivotally connected to a fixed linkage mechanism. The actuator cable includes a clevis mounted for pivotable movement about a vertical pivot axis coinciding with the axis about which the operator's station is rotatably movable. As a result, the actuator cable reversibly effects operation of the hydraulic system to effect movement of the tractor in the direction corresponding to the direction of movement of the control lever irrespective of the rotated position selected for the operator's station.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
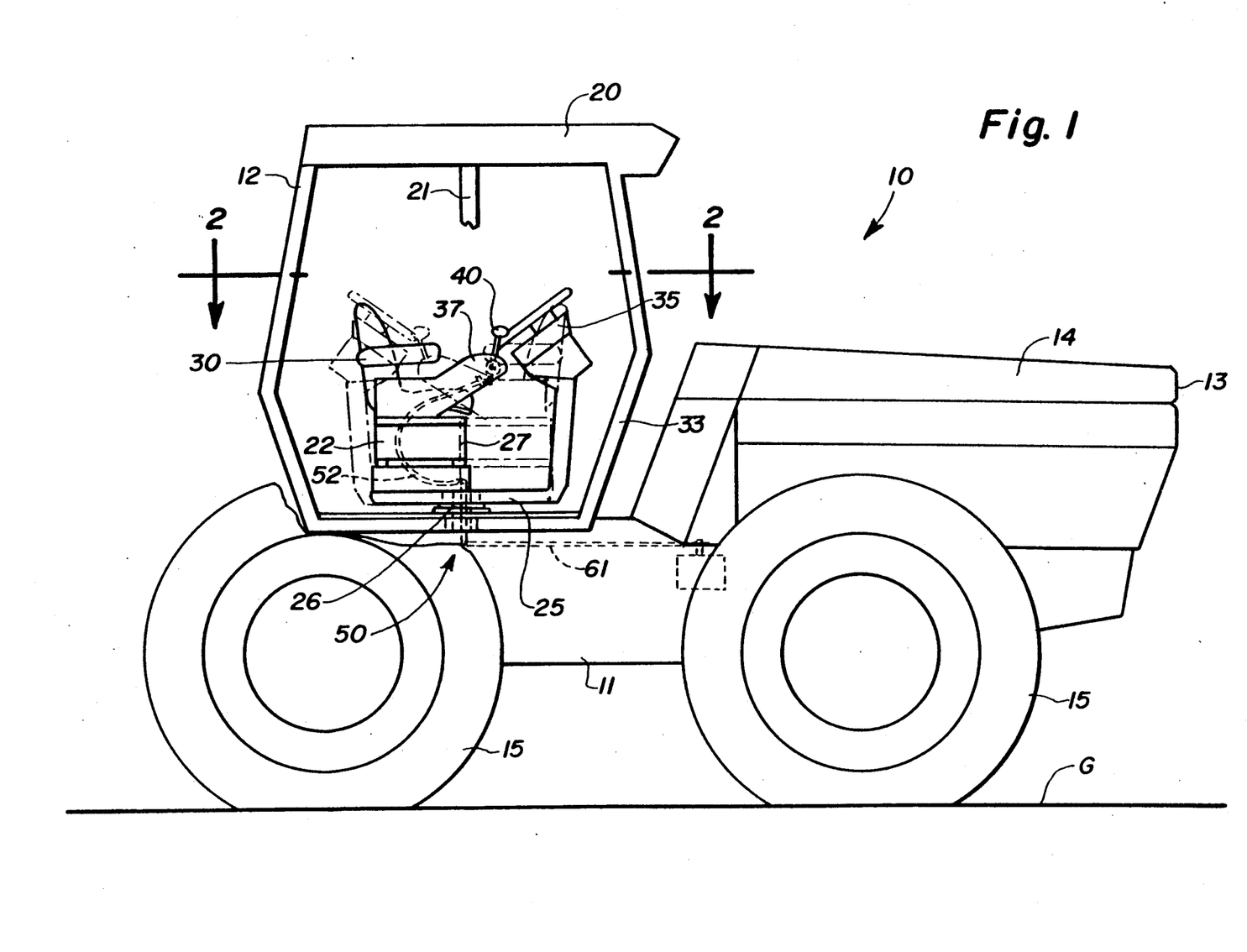
FIG. 1 is a side elevational view of a tractor incorporating the principles of the instant invention, a portion of the operator's cab being broken away to more clearly show the operator's station, the rotative movement of the console being shown in phantom.

Referring now to FIG. 1, a side elevational view of a tractor 10 incorporating the principles of the instant invention can best be seen. As described in U.S. Pat. Nos. 4,372,341 and 4,822,962, the descriptive portions of both patents being incorporated herein by reference, the tractor 10 is hydrostatically driven and can be operated with equal efficiency in either opposing direction. The tractor 10 is typically referred to as having a cab end 12 and an engine end 13 to which reference is typically made to indicate the selected forward direction of travel. The tractor 10 is provided with a frame 11 supported above the ground G by conventional ground wheels 15. Operative power is provided by an engine (not shown) enclosed within the hood 14 positioned at the engine end 13 of the tractor 10. The tractor 10 is preferably articulated so that steering can be accomplished through conventional manipulation of the articulation joint (not shown). Alternatively, the tractor 10 could be steered through a conventionally pivotable turning movement of one pair of the ground wheels 15.

The operator's cab 20 is mounted on the cab end 12 of the tractor 10 and forms an enclosure within which the operator's station 22 is positioned. The operator's station 22 is best seen with reference to FIGS. 1-3 and includes a pivotable console 25 mounted on a pivot mechanism 26 supported by the frame 11. The pivot mechanism 26 defines a pivot axis 27 about which the pivoted console 25 is rotatably moveable to orient the operator so that the operator is facing the selected forward direction of travel. The pivot mechanism 26, as best seen in FIG. 4, includes an inner member 28 fixed to the frame 11 and an outer member 29 rotatably mounted on the inner member 28 for rotational movement relative thereto. The outer member 29 is fixed to the console 25 and permits rotational movement thereof about the pivot axis 27.

Referring again to FIGS. 1-3, the console 25 includes a seat 30, a steering mechanism 35, a hollow housing 33 extending between the seat 30 and the steering mechanism 35 to position the steering mechanism 35 at an appropriate location for convenient manipulation by the operator positioned within the seat 30, and a control panel 37 mounted with the seat 30 in a fixed relationship thereto for pivotal movement therewith about the pivot axis 27. The cab 20 provides a relatively small space within which the console 25 can be pivotally moved about the axis 27. Accordingly, it is necessary to reduce the overall length of the console 25 by moving the seat 30 toward the steering mechanism 35, provided the seat is equipped with an appropriate fore-and-aft adjustment mechanism (not shown), and by tilting the steering mechanism 35 toward the seat 30 to permit the console 25 to clear the cab support posts 21 during its rotative movement, as indicated by the arc 39. Because of the positional movements of the steering mechanism 35, it is preferable that the steering operation be hydraulically accomplished, rather than mechanically.

The control panel 37 has mounted thereon for pivotal movement along a generally linear path of movement a control lever 40, commonly referred to as an FNR lever (indicating the forward, neutral and reverse directions of travel of the tractor 10). The FNR lever 40 is connected to a conventional hydraulic system (not shown) carried by the tractor 10 to provide operative power for movement of the tractor 10 in either direction, i.e. toward the cab end 12 or the engine end 13. The FNR lever 40 controls operation of the hydraulic system such that the tractor 10 moves in the direction corresponding to the direction of movement of the FNR control lever 40, the speed of movement being directly proportional to the distance the lever 40 is moved from its neutral position.

Figure 2:
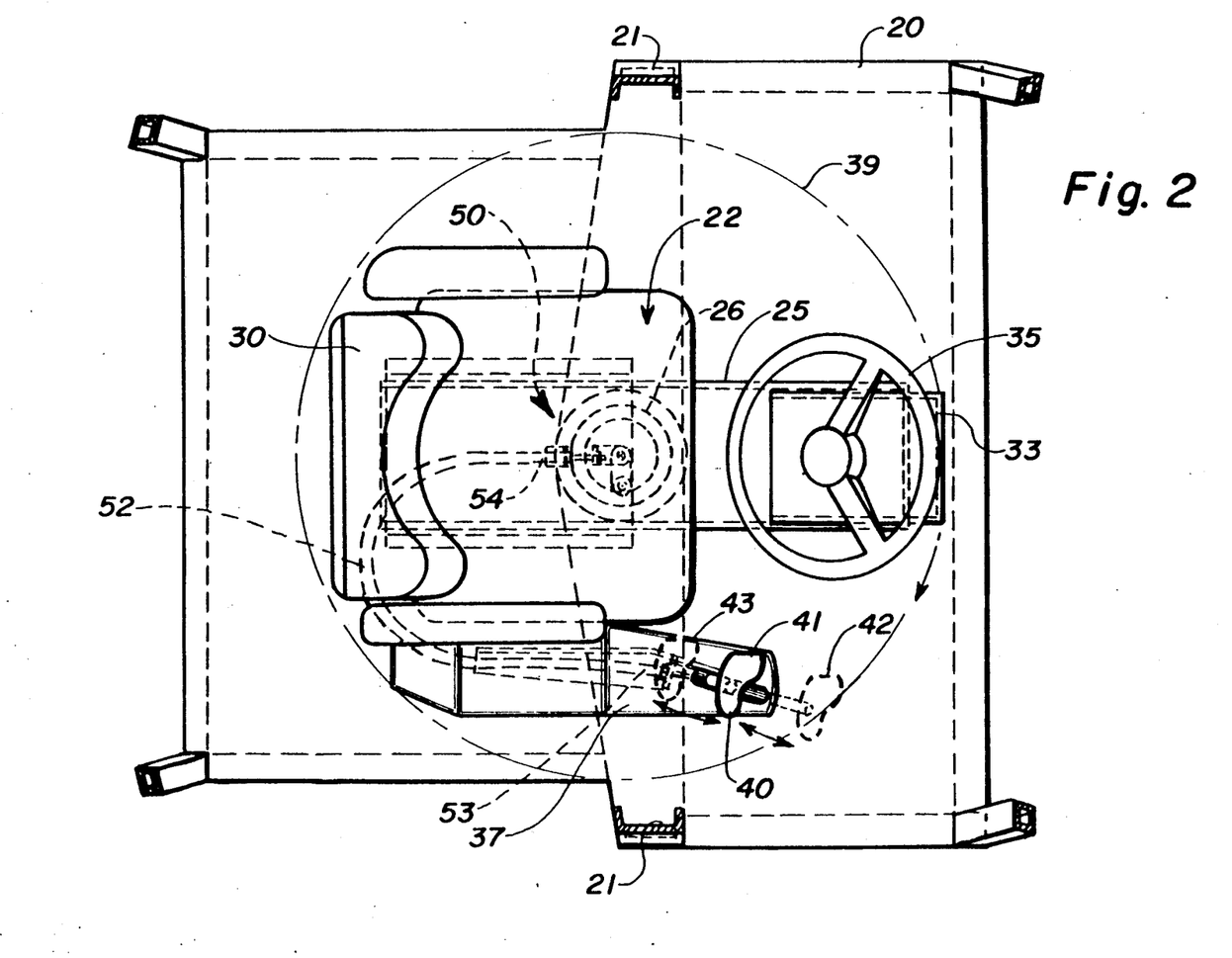
FIG. 2 is a partial cross-sectional view of the vehicle showing a top plan view of the operator's station corresponding to lines 2—2 of FIG. 1, the operator's station being oriented to position the operator sitting in the seat toward the engine end of the tractor.
Figure 3:
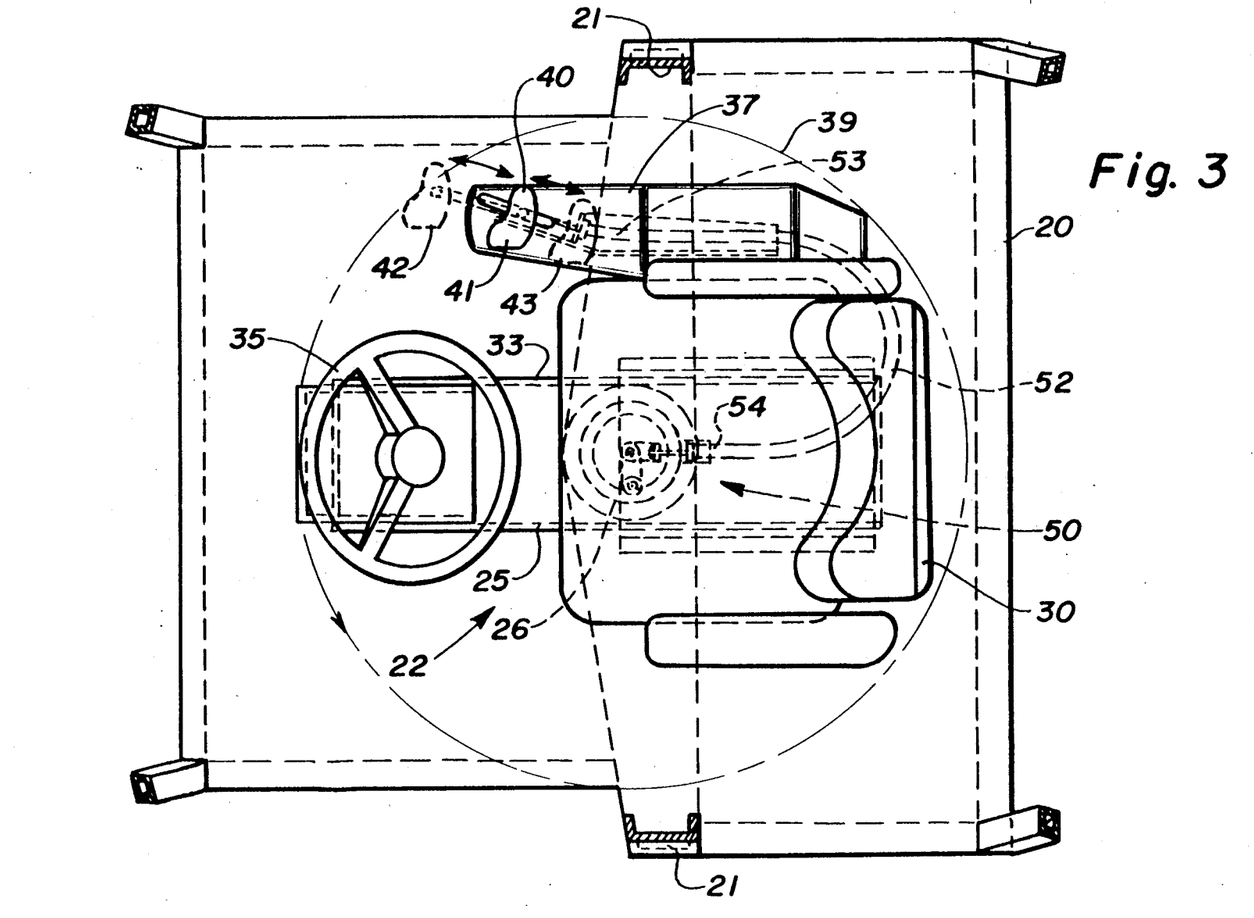
FIG. 3 is a partial cross-sectional view of the vehicle similar to that of FIG. 2 with the operator's station being rotated to a position orienting the operator toward the cab end of the tractor.
Figure 4:
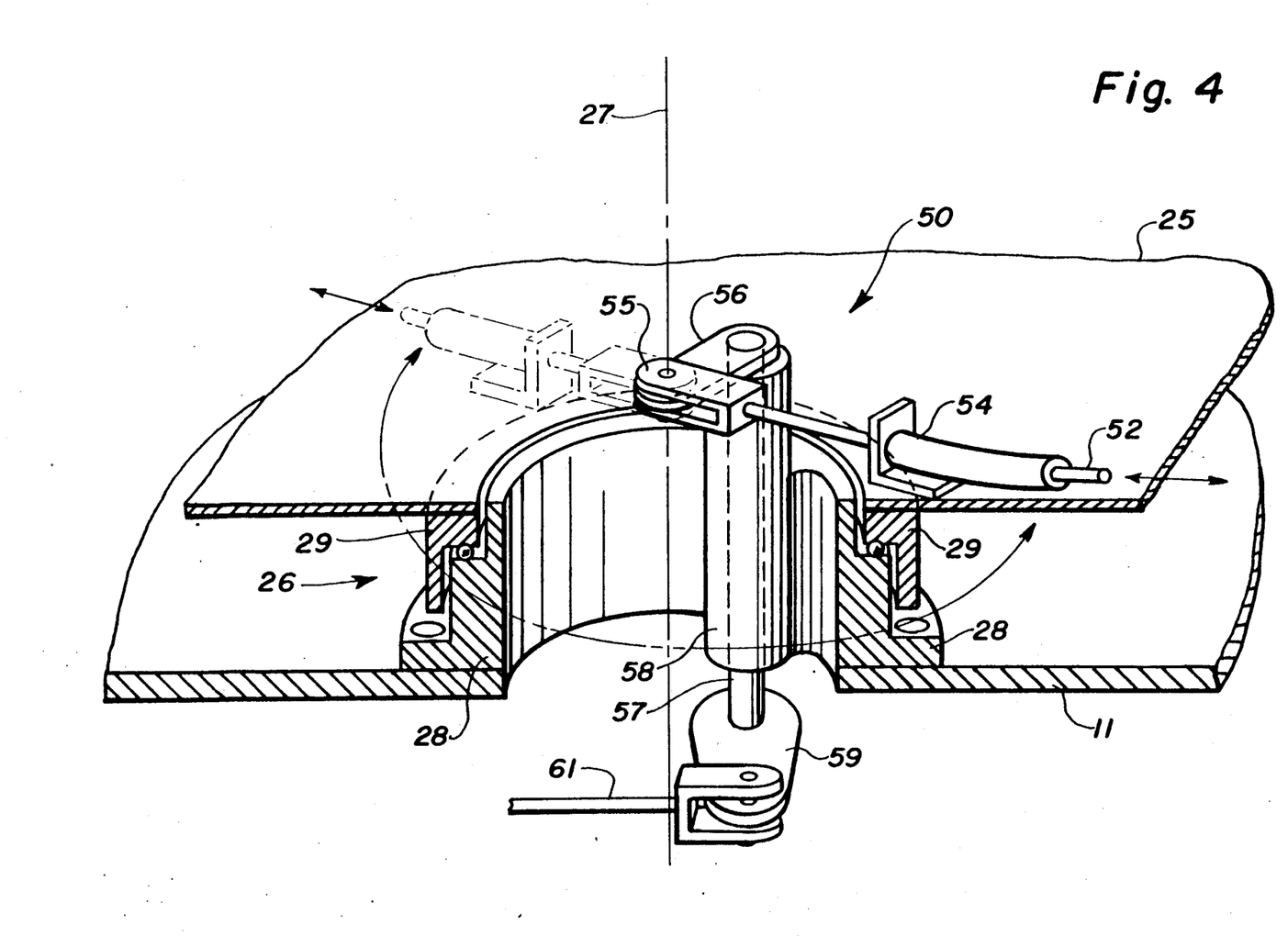
FIG. 4 is a perspective partial cross-sectional view of the operator's station taken through the pivot mechanism to show a perspective elevational view of the linkage mechanism positioned within the pivot mechanism, the rotated movement of the clevis and flexible push/pull cable being shown in phantom.
Figure 5:
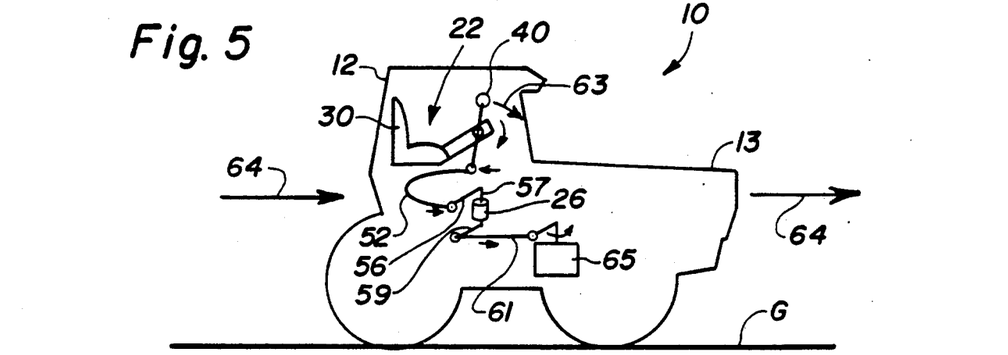
FIG. 5 is a schematic side elevational view of the tractor schematically showing the control lever and actuation linkage to effect movement of the tractor in a forward direction with the operator's station positioned to face the engine end of the tractor.

Examples of the movement of the control lever 40 can be seen in FIGS. 2 and 3. Referring first to FIG. 2, the neutral position 41 of the control lever 40 is shown in solid lines in an intermediate position. Movement of the control lever 40 from the neutral position 41 to a forward position 42 as shown in phantom will effect the movement of the tractor in a direction toward the engine end 13, which is considered to be forward because the operator's station 22 is positioned to orient the operator toward the engine end 13. Conversely, a movement of the control lever 40 from the neutral position 41 to a rearward position 43, as shown in phantom will cause movement of the tractor 10 in a rearward direction toward the cab end 12.

When the operator's station 22 is rotatably moved to orient the operator in the seat 30 to be facing toward the cab end 12 of the tractor 10, as depicted in FIG. 3, a movement of the control lever 40 from the neutral position 41 to the forward position 42 causes movement of the tractor 10 in a direction toward the cab end 12, considered to be forward due to the orientation of the operator facing the cab end 12 of the tractor. As indicated above with respect to the operation of the control lever 40 in FIG. 2, a movement of the control lever 40 from the neutral position 41 to the rearward position 43 will cause movement of the tractor 10 in a rearward direction toward the engine end 13.

To permit this reversible operation of the control lever 40, an actuation linkage 50 operatively interconnects the control lever 40 with the hydraulic system (not shown) carried by the tractor 10. The actuation linkage 50 includes a push/pull cable 52 connected at one end 53 to the FNR control lever 40 and at the opposing end 54 to a clevis 55 positioned for rotative movement about the pivot axis 27, as best depicted in FIGS. 2-4. The clevis 55 is pivotally connected to a first link 56 affixed to a shaft 57 journalled for movement within a housing 58 attached to the interior of the inner member 28 of the pivot mechanism 26. The shaft 57 is in turn fixed to a second link 59 for rotative movement therewith in fixed relationship to the first link 56. The second link 59 is pivotally connected to a connection link 61 to effect operative control of the hydraulic system in a conventional manner.

Since the clevis 55 is mounted for pivotal movement about the axis 27 a rotational movement of the operator's station 22 through an arc of approximately 180° will effect a corresponding pivotal movement of the push/pull cable 52 and attached clevis 55 about the pivot axis 27 with the control lever 40 to a position shown in phantom in FIG. 4. The remaining parts of the actuation linkage 50, namely the first and second links 56, 59, the shaft 57, housing 58, and connecting link 61 remain as a fixed portion of the linkage with the push/pull cable 52 rotating relative thereto about the pivot axis 27.

With reference to the structural views seen in FIGS. 2-4 and the schematic representation of FIGS. 5-8, the operation of the control lever 40 in actuation linkage 50 can best be seen. Referring first to the schematic view of FIG. 5, the operator's station 22 is positioned to orient the operator in the seat 30 toward the engine end 13 of the tractor 10. Movement of the control lever 40 away from the operator, as depicted by the arrow 63, which is toward the engine end 13, effects a movement of the push/pull cable 52 to move the first link 56 toward the engine end 13. Since both the first and second links 56, 59 are fixed to the shaft 57 journalled within the fixed housing 58, the movement of the first link 56 effects a corresponding movement of the second link 59 which in turn moves the connecting link 61 toward the engine end effecting a first movement of the hydraulic system, schematically represented by the box 65, to effect a flow of hydraulic fluid causing movement of the tractor 10 with the engine end 13 leading, as indicated by the arrows 64.

Figure 6:
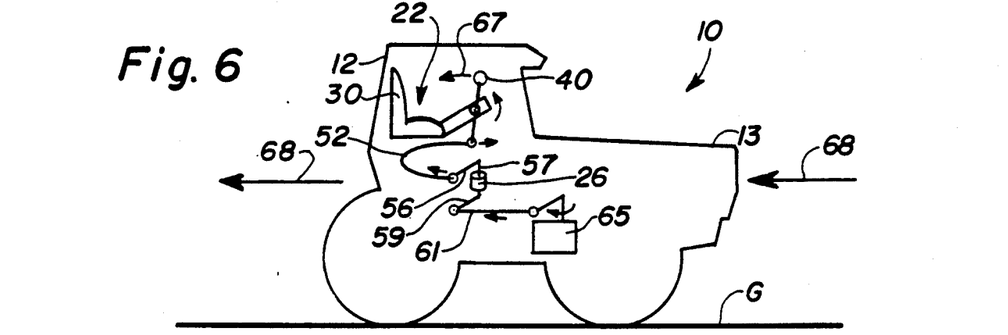
FIG. 6 is a schematic side elevational view of the tractor similar to that of FIG. 5 to show operation of the control lever to effect reverse movement of the tractor when the operator's station is oriented to position the operator toward the engine end of the tractor.

The opposite movement of the tractor 10 is depicted schematically in FIG. 6. As with FIG. 5, the operator's station 22 is oriented so the operator faces the engine end 13. A movement of the control lever 40 toward the operator as indicated by the arrow 67, which is toward the cab end 12 causes a corresponding movement of the push/pull cable 52 to effect movement of the first and second links 56, 59 toward the cab end 12, along with the connecting link 61, to effect a movement of the hydraulic system 65 opposite to that described above with respect to FIG. 5. As a result, the flow of hydraulic fluid through the hydraulic system will effect a movement of the tractor 10 in a direction with the cab end 12 leading, as represented by the arrows 68.

Figure 7:
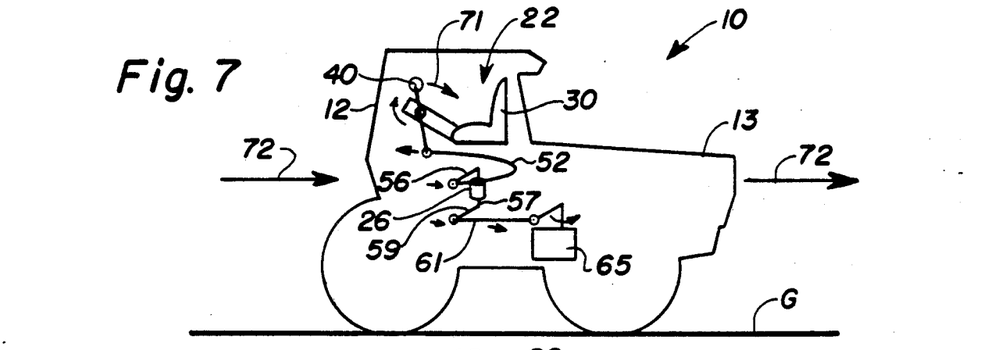
FIG. 7 is a schematic side elevational view of the tractor similar to that of FIG. 5 to show operation of the control lever and associated linkage to effect movement of the tractor in a reverse direction with the operator's station being oriented to position the operator toward the cab end of the tractor.
Figure 8:
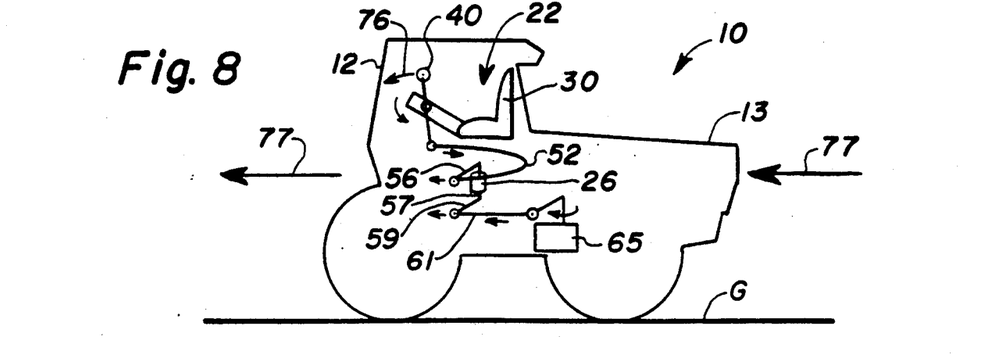
FIG. 8 is a schematic side elevational view similar to that of FIG. 7 showing the operation of the control lever and associated linkage to effect forward movement of the tractor when the operator's station is rotated to orient the operator toward the cab end of the tractor.

As schematically indicated in FIG. 7, the operator's station 22 has been rotated so that the operator is now facing the cab end 12 of the tractor 10. As noted above, the FNR control lever 40 rotatably moves with the seat 30 in a fixed relationship thereto. As indicated in FIGS. 2-4, the push/pull cable 52 rotates with the control lever 40 about the pivot axis 27 such that the clevis 55 is oriented with the push/pull cable 52 to effect an opposing movement of the first and second links 56, 59, as compared to the orientation schematically shown in FIGS. 5 and 6.

Accordingly, the movement of the control lever 40 in a direction toward the operator as indicated by the arrow 71, which is toward the engine end 13, causes the push/pull cable 52 to effect movement of the first and second links 56, 59 and the connecting link 61 to cause operation of the hydraulic system 65 in a manner identical to that described above with respect to FIG. 5, causing the tractor 10 to move with the engine end 13 leading as indicated by arrows 72. As described above relative to FIG. 6, the converse movement of the control lever 40 shown in FIG. 8 by the arrow 76 causes the opposite operation of the hydraulic system 65 to move the tractor 10 with the cab end 12 leading as represented by arrows 77.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a frame supported above the ground by ground engaging wheels to mobilely support said vehicle over the ground; and operator controls supported by said frame to control operative functions of said vehicle, said operator controls including a pivotable console selectively rotatable about a pivot mechanism defining a generally vertical pivot axis about which said console is rotatable for selectively orienting an operator positioned on said console in opposing directions, said console including a seat, a steering mechanism for controlling the directional movement of said vehicle, and a housing supporting said steering mechanism for rotative movement with said seat about said pivot axis, said operator controls further including a control panel having a control lever movably mounted thereon for operatively controlling the direction and speed of propulsion of said vehicle, the improvement comprising:

said control lever being mounted in a fixed relationship with said seat for rotation therewith about said pivot axis, said control lever being operably connected with propulsion means carried by said vehicle for operatively powering the movement thereof by an actuation linkage permitting operation of said propulsion means when said seat is rotated between opposing positions so that the direction of propulsion of said vehicle corresponds to the direction of movement of said control lever irrespective of the rotated position of said seat.

2. The vehicle of claim 1 wherein said actuation linkage includes a fixed portion supported by said frame and connected to said propulsion means, and a rotatable portion interconnecting said control lever and said fixed portion, said rotatable portion being movable with said control lever and being pivotally connected to said fixed portion 3. The vehicle of claim 2 wherein the pivotal connection between said fixed portion and said rotatable portion is aligned with said pivot axis.

4. The vehicle of claim 3 wherein said pivot mechanism includes an inner member mounted in fixed relationship to said frame and an outer member attached to said console and being rotatably mated with said inner member, said inner member having a generally vertical passage therethrough corresponding to said pivot axis, said fixed portion of said actuation linkage being positioned within said passage.

5. The vehicle of claim 4 wherein said rotatable portion includes a clevis pivotally connected to said fixed portion to permit pivotable movement relative thereto.

6. The vehicle of claim 5 wherein said fixed portion of said actuation linkage includes a housing fixed to said inner portion of said pivot mechanism, a shaft journalled within said housing and having fixed thereto at opposing ends thereof a pair of link members, said clevis being pivotally connected to one of said link members, the other said link member being connected to said propulsion means by a connecting link.

7. The vehicle of claim 6 wherein said rotatable portion of said actuation linkage further includes a push-/pull cable interconnecting said control lever and said clevis such that a movement of said control lever effects a corresponding movement of said fixed portion of said actuation linkage.

8. In a vehicle having a frame supported above the ground by ground engaging wheels to mobilely support said vehicle over the ground; and operator controls supported by said frame to control operative functions of said vehicle, said operator controls including a pivotable console selectively rotatable about a pivot mechanism defining a generally vertical pivot axis about which said console is rotatable for selectively orienting an operator positioned on said console in opposing directions, said console including a seat, a steering mechanism for controlling the directional movement of said vehicle, and a housing supporting said steering mechanism for rotative movement with said seat about said pivot axis, said operator controls further including a control panel having a control lever movably mounted thereon and being operatively associated with a propulsion means for controlling the direction and speed of propulsion of said vehicle, the improvement comprising:

an actuation linkage interconnecting said propulsion means and said control lever, said actuation linkage including a fixed portion supported by said frame and connected to said propulsion means, and a rotatable portion interconnecting said control lever and said fixed portion, said rotatable portion being movable with said control lever about said pivot axis and being pivotally connected to said fixed portion by a clevis rotatable about said fixed portion as said control lever is rotated about said pivot axis so that the direction of propulsion of said vehicle corresponds to the direction of movement of said control lever irrespective of the rotated position of said seat.

9. The vehicle of claim 8 wherein the pivotal connection between said fixed portion and said rotatable portion is aligned with said pivot axis.

10. The vehicle of claim 9 wherein said pivot mechanism includes an inner member mounted in fixed relationship to said frame and an outer member attached to said console and being rotatably mated with said inner member, said inner member having a generally vertical passage therethrough corresponding to said pivot axis, said fixed portion of said actuation linkage being positioned within said passage.

11. The vehicle of claim 10 wherein said fixed portion of said actuation linkage includes a housing fixed to said inner portion of said pivot mechanism, a shaft journalled within said housing and having fixed thereto at opposing ends thereof a pair of link members, said clevis being pivotally connected to one of said link members, the other said link member being connected to said propulsion means by a connecting link.

12. An operator control station for a vehicle operable in opposing directions and having a wheeled frame for mobilely supporting said vehicle over the surface of the ground, comprising:

a pivotable console selectively rotatable about a pivot mechanism defining a generally vertical pivot axis about which said console is rotatable for selectively orienting an operator positioned on said console in opposing directions, said console including a seat, a steering mechanism for controlling the directional movement of said vehicle, and a housing supporting said steering mechanism for rotative movement with said seat about said pivot axis;

a control panel having a control lever movable mounted thereon and operatively connected to a propulsion means for controlling the direction and speed of propulsion of said vehicle;

an actuation linkage interconnecting said propulsion means and said control lever, said actuation linkage including a fixed portion supported by said frame and connected to said propulsion means, and a rotatable portion interconnecting said control lever and said fixed portion, said rotatable portion being movable with said control lever about said pivot axis and being pivotally connected to said fixed portion by a clevis rotatable about said fixed portion as said control lever is rotated about said pivot axis;

said pivot mechanism including an inner member mounted in fixed relationship to said frame and an outer member attached to said console and being rotatably mated with said inner member, said inner member having a generally vertical passage therethrough corresponding to said pivot axis, said fixed portion of said actuation linkage being positioned within said passage;

said fixed portion of said actuation linkage including a housing fixed to said inner portion of said pivot mechanism, a shaft journalled within said housing and having fixed thereto at opposing ends thereof a pair of link members, said clevis being pivotally connected to one of said link members, the other said link member being connected to said propulsion means by a connecting link, whereby the direction of propulsion of said vehicle corresponds to the direction of movement of said control lever irrespective of the rotated position of said seat.

13. The vehicle of claim 12 wherein said rotatable portion of said actuation linkage further includes a push/pull cable interconnecting said control lever and said clevis such that a movement of said control lever effects a corresponding movement of said fixed portion of said actuation linkage.

* * * * *